United States Patent [19]

Samukawa et al.

[11] Patent Number: 5,676,204
[45] Date of Patent: Oct. 14, 1997

[54] AIR CONDITIONER FOR USE IN A VEHICLE

[75] Inventors: Katsuhiko Samukawa, Oobu; Yuji Honda, Okazaki, both of Japan

[73] Assignee: Nippondenso Co., Ltd., Kariya, Japan

[21] Appl. No.: 508,825

[22] Filed: Jul. 28, 1995

[30] Foreign Application Priority Data

Jul. 29, 1994 [JP] Japan .................................. 6-178247
Aug. 26, 1994 [JP] Japan .................................. 6-202002

[51] Int. Cl.$^6$ .................................. F25B 29/00; B60H 1/00
[52] U.S. Cl. .................................. 165/204; 165/43; 236/91 C; 454/75
[58] Field of Search .................................. 165/204, 42, 43; 236/91 C; 454/75

[56] References Cited

U.S. PATENT DOCUMENTS

| | | | |
|---|---|---|---|
| 4,757,944 | 7/1988 | Kagohata et al. | 165/42 |
| 5,186,682 | 2/1993 | Iida | 236/91 C |
| 5,199,485 | 4/1993 | Ito et al. | 236/91 C |
| 5,209,079 | 5/1993 | Kajino et al. | 236/91 C |
| 5,337,802 | 8/1994 | Kajino et al. | 236/91 C |
| 5,340,021 | 8/1994 | Kajino et al. | 236/91 C |

FOREIGN PATENT DOCUMENTS

| | | |
|---|---|---|
| 5124415 | 5/1993 | Japan . |
| 5124416 | 5/1993 | Japan . |
| 5131837 | 5/1993 | Japan . |

*Primary Examiner*—John K. Ford
*Attorney, Agent, or Firm*—Cushman, Darby & Cushman IP Group of Pillsbury Madison & Sutro LLP

[57] ABSTRACT

An air conditioner for a vehicle wherein a vehicle compartment can be quickly warmed up if it is cool and, when the vehicle compartment has been warmed up, the heat load caused by incident solar radiation can be offset without having the vehicle driver feel cold. A variable GW is determined by a balance (Tset−Tr) between a setting temperature and a vehicle inside air temperature, and a corrected solar radiation quantity is defined as a value which is a product of a value detected by a solar radiation sensor and the variable GW. Based on this corrected solar radiation quantity, there are decided a temperature falling allowance and an air volume rising allowance of the air blown from a face level air outlet. If a first necessary blown air temperature (TAOD) is lower than 25° C., a distribution ratio Fs is set as 1 and is made gradually smaller if TAOD is higher than 25° C. The second necessary blown air temperature is computed based on said TAOD and a product of said Fs and the solar radiation quantity detected by the solar radiation sensor.

16 Claims, 12 Drawing Sheets

AIR CONDITIONER FOR USE IN A VEHICLE

BACKGROUND OF THE INVENTION

1. Field of the Invention

The present invention relates to an air conditioner for use in a vehicle and, more particularly, the invention relates to the correction and control of solar radiation incident on a vehicle compartment during space-heating thereof.

2. Description of the Related Art

Heretofore, there has been known an air conditioner for use in a vehicle which performs partial solar radiation control. According to such an air conditioner, when the space heating of the vehicle compartment is carried out in a mode in which warm air is blown from a foot level air outlet toward a vehicle driver's feet, if the solar radiation is incident on the vehicle compartment, the operation mode is switched from said foot mode to a bi-level mode in which, in addition to said warm air supply from the foot level air outlet, cool air is supplied from a face level air outlet, thereby offsetting the heat load caused by the incident solar radiation.

According to this control method, if the vehicle compartment is sufficiently warmed up already, the incident solar radiation would make the vehicle driver feel hot. In this sense, therefore, control like said partial solar radiation control might be effective. If, however, the vehicle compartment is not adequately warmed up yet, namely, still rather cold, the vehicle driver might not always feel the incident solar radiation to be hot. In such a situation, if the cool air is blown out of the face level air outlet according to said partial solar radiation control, the vehicle driver would, instead feel cold. At the same time, it would take a much time until the vehicle is comfortably warmed up.

As a countermeasure to such a problem as mentioned above, an idea has been disclosed in a Japanese Unexamined Patent Publication No. Hei 5-131837. According to this idea, there is set a weighting coefficient from 0 to 1 corresponding to the difference between a setting temperature and an actual vehicle compartment temperature, and the cool air volume supplied from the face level air outlet is controlled depending on said weighting coefficient. Namely, if said difference is large (the vehicle compartment is not yet sufficiently warmed up), the weighting coefficient is set as zero, thereby reducing the blown cool air volume to zero.

According to the idea disclosed in said patent publication, the cool air would not be supplied while said difference is large even though solar radiation is incident on the vehicle. Consequently, the time for warming up the vehicle compartment might be made shorter. In such a partial solar radiation control, however, no consideration is paid to the temperature of the blown air from the face level air outlet, so that even if the air supply is commenced through the face level air outlet after said difference is reduced by continuous space heating and said weighting coefficient becomes larger than zero, the vehicle driver would still feel cold because cold air is still supplied from the face level air outlet.

SUMMARY OF THE INVENTION

Accordingly, in view of the problem as described above, an object of the present invention is to provide an air conditioner for use in a vehicle wherein the vehicle compartment can be quickly warmed up when it is cool but the heat load caused by the incident solar radiation can be offset without having the vehicle driver feel cold when the vehicle compartment has warmed up.

According to the present invention, there is provided a first air conditioner for use in a vehicle wherein there are provided:

an air supply means for generating air flow, an air path for introducing the air from said air supply means to a vehicle compartment, means for adjusting the air temperature inside said air path, a face level duct which is arranged inside said air path downstream of said air temperature adjusting means and is provided, at its end portion, with a face level air outlet for use in blowing air toward the upper half of a vehicle driver, a foot level duct which is arranged inside said air path in the downstream of said air temperature adjusting means and is provided, at its end portion, with a foot level air outlet for use in blowing air toward the vehicle driver's foot area, means for setting a vehicle inside air temperature, means for detecting a vehicle inside air temperature, means for detecting an outside air temperature, and means for computing a basic objective temperature of the air blown to the vehicle compartment based on a setting temperature as set by said temperature setting means, the inside air temperature detected by said inside air temperature detecting means, and the outside air temperature detected by said outside air temperature detecting means, and control of the temperature and volume of the air supplied from said face level air outlet and said foot level air outlet being performed by controlling said air temperature adjusting means and said air supply means based on said basic objective blown air temperature, said air conditioner for use in a vehicle comprising:

means for detecting the quantity of an incident solar radiation in the vehicle, means for correcting for the incident solar radiation quantity in such a manner that if the vehicle inside air temperature becomes lower, exceeding a predetermined reference temperature with respect to a predetermined reference value, said detected incident solar radiation quantity is corrected to become smaller, means for determining an allowable decreasing amount of the blown air temperature which is increased in proportion to an increase in said corrected incident solar radiation quantity when said blown air temperature is higher than a predetermined temperature, means for determining an allowable increasing amount of the blown air volume which is increased in proportional to an increase in said corrected incident solar radiation quantity when said blown air temperature is higher than said predetermined temperature, a control means which controls said temperature adjusting means in such a manner that the temperature of the blown air from said face level air outlet is reduced by said falling allowance, and also controls said air supply means in such a manner that the blown air volume from said face level air outlet is increased by said rising allowance.

Further, according to the present invention, there is provided a second air conditioner for used in vehicles wherein there are provided:

an air supply means for generating air flow, an air path for introducing the air from said air supply means to a vehicle compartment space, means for adjusting the air temperature in said air path, a face duct which is arranged inside said air path downstream of said air temperature adjusting means and is provided, at its end portion, with a face level air outlet which is used for blowing air toward the upper half of a vehicle driver, a foot duct which is arranged inside said air path downstream of said air temperature adjusting means and is provided, at its end portion, with a foot level air outlet which is used for blowing air toward the feet of the vehicle driver, means for setting a vehicle inside air temperature, means for detecting a vehicle inside air temperature, means for detecting an outside air temperature, and means for computing a first necessary temperature for the air blown into a vehicle compartment based on a setting temperature as set by said temperature setting means, an inside air temperature detected by said inside air temperature detecting means, and an outside air temperature detected by said outside air temperature detecting means, means for detecting the quantity of incident solar radiation on the vehicle, means for computing a second necessary temperature for the air blown into the vehicle compartment based on said first necessary blown air temperature and a predetermined quantity of said detected incident solar radiation quantity, means for controlling said temperature adjusting means in such a manner that the temperature of the air blown from said face level air outlet and said foot level air outlet becomes said second necessary blown air temperature, means for computing an increased air volume from said face level air outlet based on the remaining solar radiation quantity which is the difference between said detected incident solar radiation quantity and said predetermined quantity, means for controlling said air supply means in such a manner that the air volume supplied from said face level air outlet is increased by said increased air volume as computed by said increased air volume computing means, and a ratio computing means for computing a ratio of said predetermined quantity to said remaining quantity based on a physical quantity relating to respective seasons.

In the first air conditioner for use in a vehicle according to the present invention, if the basic objective blown air temperature is higher than said predetermined value, the air outlet mode is usually set to the foot mode in which a warm air is blown from the foot level air outlet. In this situation, if solar radiation is detected by the solar radiation detecting means, the air outlet mode is changed to the bi-level mode in which a warm air is blown from the foot level air outlet and at the same time, a cool air is blown from the face level air outlet.

In this case, if the vehicle inside air temperature is lower, and exceeds a predetermined reference temperature, with respect to a reference value i.e. if the vehicle compartment is cool, said detected solar radiation quantity is corrected to make it smaller. The corrected solar radiation quantity itself is made smaller in this way if the vehicle compartment is cool, so that both the temperature falling allowance and the air volume rising allowance of the blown air from the face level air outlet are made smaller, said allowances being decided by a means for deciding the blown air temperature falling allowance and a means for deciding the blown air volume rising allowance, respectively.

Accordingly, if it is still cold in the vehicle compartment as mentioned above, the temperature of the blown air from the face level air outlet is made less cool and the air volume from the same is made less large, even in the event that solar radiation is incident in the vehicle compartment, so that it is prevented that the efficiency of the space heating, with warmed blown air from the foot level air outlet, is reduced with cool blown air from the face level air outlet. When the vehicle compartment is cool, the blown air from the face level air outlet is made less cool, so that it would rarely happen that the vehicle driver would feel cold.

Especially, according to the invention as recited in claim 4, if the vehicle inside air temperature becomes lower, exceeding a predetermined reference temperature, with respect to a predetermined reference value, the lower said inside air temperature becomes, the more said corrected incident solar radiation quantity is made small. Consequently, the more cool the vehicle compartment is, the more both the temperature falling allowance and the volume rising allowance of the air blown from the face level air outlet for offsetting the heat load caused by solar radiation are made small, and priority is given to the vehicle indoor space heating.

According to the invention as recited in claim 5, if the vehicle inside air temperature becomes lower, exceeding a predetermined second reference temperature, with respect to a predetermined reference value and the vehicle compartment is very cool, said corrected solar radiation quantity is made zero, thus both temperature falling allowance and volume rising allowance of the blown air from the face level air outlet being made zero. Consequently, no air is delivered from the face level air outlet even if solar radiation is incident on the vehicle, and the first priority is placed on the space heating of the vehicle compartment.

In this way, if the space heating of the vehicle compartment is continued to raise the vehicle compartment temperature and said corrected solar radiation quantity is made zero in time, the face level air outlet commences an air supply therefrom. As described above, the corrected solar radiation quantity is made small, so that the air is supplied with a temperature and a volume that are designed based on the basic objective blown air temperature.

As the vehicle compartment temperature goes up, the vehicle driver might begin to feel hot. At this time, however, according to the present invention, the corrected solar radiation quantity is made larger and the temperature of air blown from the face level air outlet is made to fall, and contrary to this, the air volume from the face level air outlet is made to increase, so that it becomes possible to offset the heat load caused by solar radiation so as to meet the vehicle driver's requirement.

As recited in claim 7, according to the present invention, if the detected outside air temperature is lower than a predetermined outside air temperature, the detected solar radiation quantity is corrected to be smaller by correcting said predetermined reference temperature until the vehicle compartment temperature further approaches said reference value. This means that if the outside air temperature is lower than the predetermined outside air temperature, the space heating of the vehicle compartment is first carried out prior to offsetting the heat load caused by solar radiation.

In short, the cooler the outside air is, the more the vehicle driver prefers a warmed vehicle compartment in general. In order to meet this preference, therefore, the priority is placed on the space heating of the vehicle compartment if the outside air temperature is lower than the predetermined outside air temperature.

As recited in claim 8, it is possible to meet the vehicle driver's feeling in such a manner that the lower the outside air temperature becomes, the more said predetermined reference temperature is corrected to make it small.

According to the second air conditioner for use in a vehicle of the present invention, the second necessary blown air temperature is computed based on a predetermined fraction of the solar radiation quantity as detected by the solar radiation quantity detecting means and the first necessary blown air temperature. Also, the increased air volume from the face level air outlet is computed based on a remaining quantity which is the difference between said detected solar radiation quantity and said predetermined fraction.

In this case, the ratio of said predetermined fraction to said remaining quantity is computed by a ratio computing means based on a physical quantity relating to respective seasons. Accordingly, said fraction and remaining quantity can be computed, for instance in such a manner that in summer, said fraction is increased and said remaining quantity is correspondingly decreased, and in winter, the former is decreased and the latter is correspondingly increased.

In this way, in the summer season, most of the detected solar radiation quantity is reflected in the second necessary blown air temperature to offset the heat load caused by solar radiation. In the winter season, the detected solar radiation quantity is less reflected in the second necessary blown air temperature, thereby the heat load caused by solar radiation is canceled, and the warmth around the vehicle driver's feet is being kept.

According to the invention as recited in claim 10, the first necessary blown air temperature is used as said physical quantity relating to respective seasons. In this case, the nearer the winter season is, the higher the first necessary blown air temperature is made and contrary to this, the nearer the summer season is, the lower the first necessary blown air temperature is made.

Also, according to the invention as recited in claim 11, the ratio of the blown air volume from said face level air outlet to the same from said foot level air outlet is used as said physical quantity relating to respective seasons. In this case, if said blown air volume ratio represents a ratio of the blown air volume from the foot level air outlet to the entire blown air volume to the vehicle compartment, the larger this air volume ratio is, i.e. near the foot mode, the nearer the winter season is, and contrary to this, the smaller said air volume ratio is, i.e. near the face mode, the nearer the summer season is.

In the invention as recited in claim 13, the outside air temperature is used as said physical quantity relating to respective seasons. In this case, the lower the outdoor temperature is, the nearer the winter season is, and the higher the outdoor temperature is, the nearer the summer season is.

Especially, in the invention as recited in claim 14, an arbitrary reference value is computed as a number between 0 and 1 based on said physical quantity relating to respective seasons. Said predetermined fraction is defined as a product of said detected incident solar radiation quantity and said reference value while said remaining quantity is defined as a product of said detected incident solar radiation quantity and the balance between 1 and said reference value. Accordingly, if said reference value is set larger in summer and if said reference value is set smaller in winter, most of the detected solar radiation quantity is reflected in the second necessary blown air temperature in summer, thereby suitably offsetting the heat load caused by solar radiation while the detected solar radiation quantity is less reflected in the second necessary blown air temperature, thus enabling the heat load to be suitably offset keeping warmth around the vehicle driver's feet.

BRIEF DESCRIPTION OF THE DRAWINGS

The present invention will be more clearly understood from the description, as set forth below, with reference to accompanying drawings, wherein.

DESCRIPTION OF THE PREFERRED EMBODIMENT

The first embodiment according to the present invention will be explained with reference to FIG. 1. The overall arrangement of this embodiment will be first described referring to FIG. 1.

Figure 1:
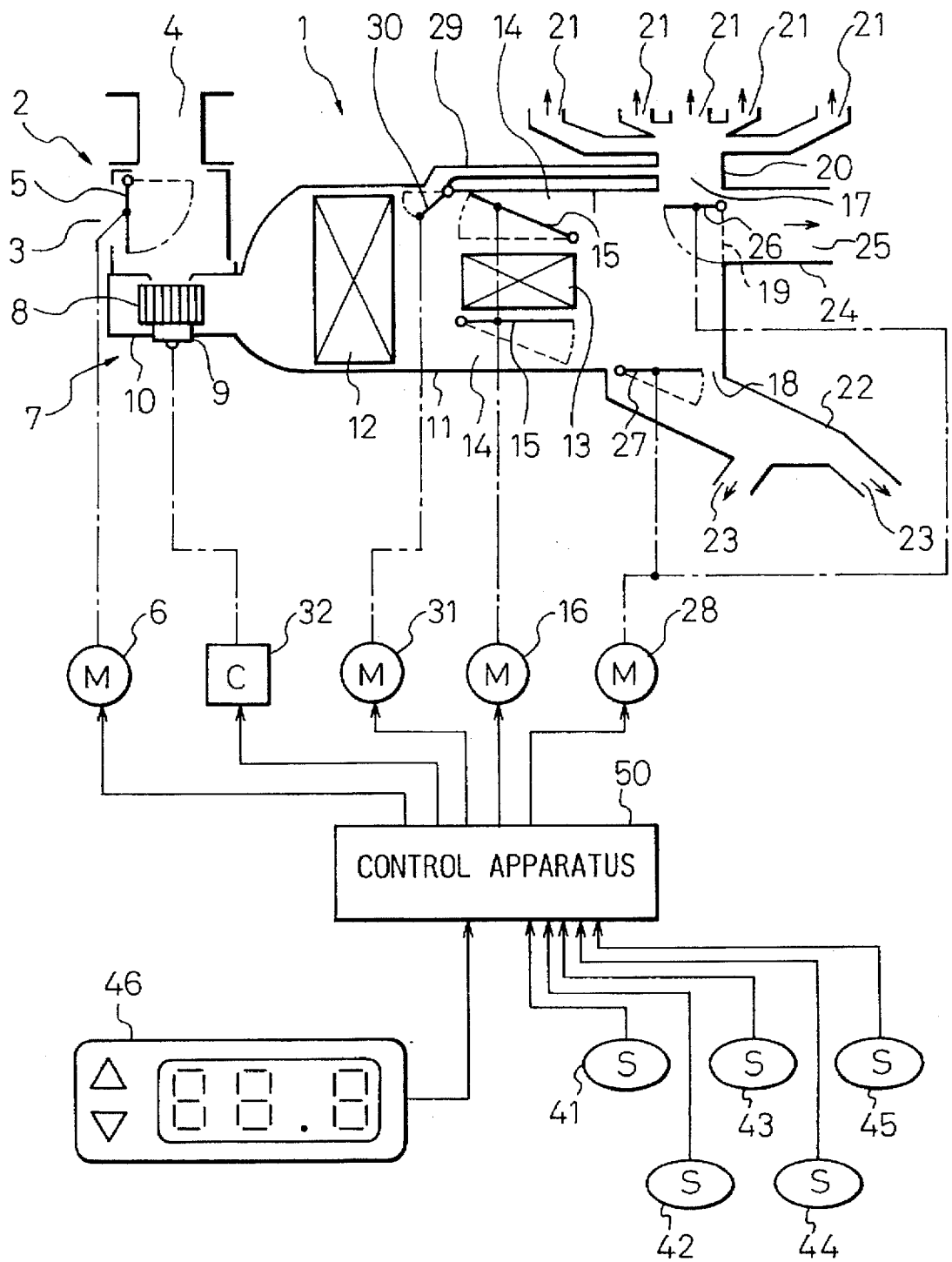
FIG. 1 is a view of entire constitution of the embodiment according to the invention.

In FIG. 1, a reference numeral 1 designates the overall ventilating system of the air conditioner for use in an automobile, and the main body of the system 1 is arranged under a dashboard in the interior of the car.

An air changeover box 2 for changing over from inside air to outside air or vice versa, is provided in the upper stream of the ventilating system 1. This changeover box 2 is provided with an outside air intake 3 and an inside air intake 4, and on the border between the indoor and outside air intakes 3 and 4, there is provided an air changeover door 5 for changing over from inside air to outside air or vice versa, to selectively open and close both air intakes. This changeover door 5 is activated with a driving means 6 like a servomotor, for instance. On the air exhaust side of the air changeover box 2, there is provided a centrifugal blower 7 which comprises a centrifugal fan 8, a blower motor 9 for driving the centrifugal fan, and a scroll casing 10 housing the centrifugal fan. The RPM of this centrifugal fan 8 depends on the blower voltage applied to the blower 9, the blower voltage being determined by means of a blower controller 32.

A reference 11 represents an air duct which is connected with the air outlet of said scroll casing 10. An evaporator 12 acting as an air cooling means is arranged in the upper stream of this air duct 11 while a heater core 13 acting as an air heating means is arranged the downstream of the same. There is also provided inside the air duct 11 a bypass 14 through which air cooled by the evaporator 12 can bypass the heater core 13.

The evaporator as described above 12 is a kind of a heat exchanger capable of constituting a well-known refrigerating system together with a compressor, a coagulator, a liquid receiver, and a pressure reducer (none of them shown), and acts to dehumidify and cool the air inside the air duct 11. The compressor as mentioned above is connected with an automobile engine through an electromagnetic clutch (not shown), of which the on-off operation controls the compressor operation.

The heater core 13 is a kind of a heat exchanger using the cooling water of the car engine as its heat source, and acts to reheat the air cooled through the evaporator 12.

An air mixing door 15 is provided on the upper stream side of the heater core 13 in respect of the air flow. This air mixing door 15 adjusts the volume of the air which is cooled through the evaporator 12 and is separately directed to the heater core 13 and the bypass 14 by means of its rotational position, and in the present embodiment, a heat adjustment means is constituted with this air mixing door 15 and the bypass 14. The air mixing door 15 is connected with a driving means 16, a servomotor, for instance, by which the air mixing door 15 is activated.

At the downstream end of the air duct 11, there are formed a plurality of air takeouts 17, 18, and 19 which introduce the air to predetermined various air outlets as arranged in the car. The air takeout 17 is connected, through a face duct 20, with a face level air outlet 21 which opens opposing to the upper half of a car driver sitting on his driving seat. The air takeout 18 is connected, via a foot duct 22, with a foot level air outlet 23 which opens close to the car driver's feet. The air takeout 19 is connected, through a defroster duct 24, with a defrosting air outlet 25 which opens on the dashboard of the front seats of the car. The air-conditioned air out of the air outlets as described above is delivered directing to the upper half of the car driver, his foot area, and the inside surface of a car front glass, respectively.

An air outlet changeover door is arranged at each inlet portion of air takeouts 17, 18, and 19 as mentioned above. Namely, an air outlet changeover door 26 is arranged to selectively open and shut air takeouts 17 and 19 while the air outlet changeover door 27 is arranged to open and shut the air takeout 18. These changeover doors 26 and 27 are connected with a driving means 28, a servomotor etc., by which they are activated.

Accordingly, if the air outlet changeover doors 26 and 27 operate to selectively open and shut air takeouts 17, 18 and 19, various air supply modes can be achieved, for instance a face mode in which the air-conditioned air is delivered from a face level air outlet 21, a bi-level mode in which the air-conditioned air is supplied from both face level air outlet 21 and foot level air outlet 23, and a defroster mode in which the air-conditioned air is sent out of a defroster air outlet 25.

The duct 11 also includes a cooled air bypass 29 which introduces the air as cooled at the evaporator 12 directly to the face duct 20 bypassing the heater core 13 and the bypass 14 as well. At the inlet portion of this cooled air bypass 29, there is provided a cooled air bypass door 30 for opening and shutting the cooled air bypass 29. The cooled air bypass door 30 is driven by a driving means 31 such as a servomotor.

A reference numeral 41 designates an inside air temperature sensor for detecting the temperature of the air inside the car, 42 an outside air temperature sensor for detecting the outside air temperature, 43 a solar radiation sensor for detecting the quantity of incident solar radiation in the car, 44 a post evaporator sensor for detecting the temperature of the air just having passed by the evaporator 12, and 45 a water temperature sensor for detecting the temperature of the car engine cooling water flowing in the heater core 15. Also, a reference numeral 46 represents a temperature regulator which is installed on the dashboard of the car and by which the car driver can manually set a desirable temperature for the car room.

Signals from the above mentioned sensors and regulator are transmitted to a control apparatus 50 which is provided with a multiplexer, an A/D converter, a microcomputer and so forth (none of them shown). Signals from the above sensors are converted into digital ones through the A/D converter and inputted to the microcomputer. This microcomputer can also receives a signal from a auto-switch (not shown) which makes the air conditioner start automatic operation.

The microcomputer includes a central processing unit (CPU), a read-only memory (ROE), a random access memory (RAM), an input/output port (I/O), and so on, and is the type as known well. For instance, if the ignition switch of the car engine is turned on, a battery (not shown) is made to supply the power to the microcomputer and, based on signals as described above, the microcomputer performs its arithmetic operation as mentioned later and transmits control signals to servomotors 6, 16, 28 and 31, the controller 32, and the electromagnetic clutch, respectively.

Figure 2:
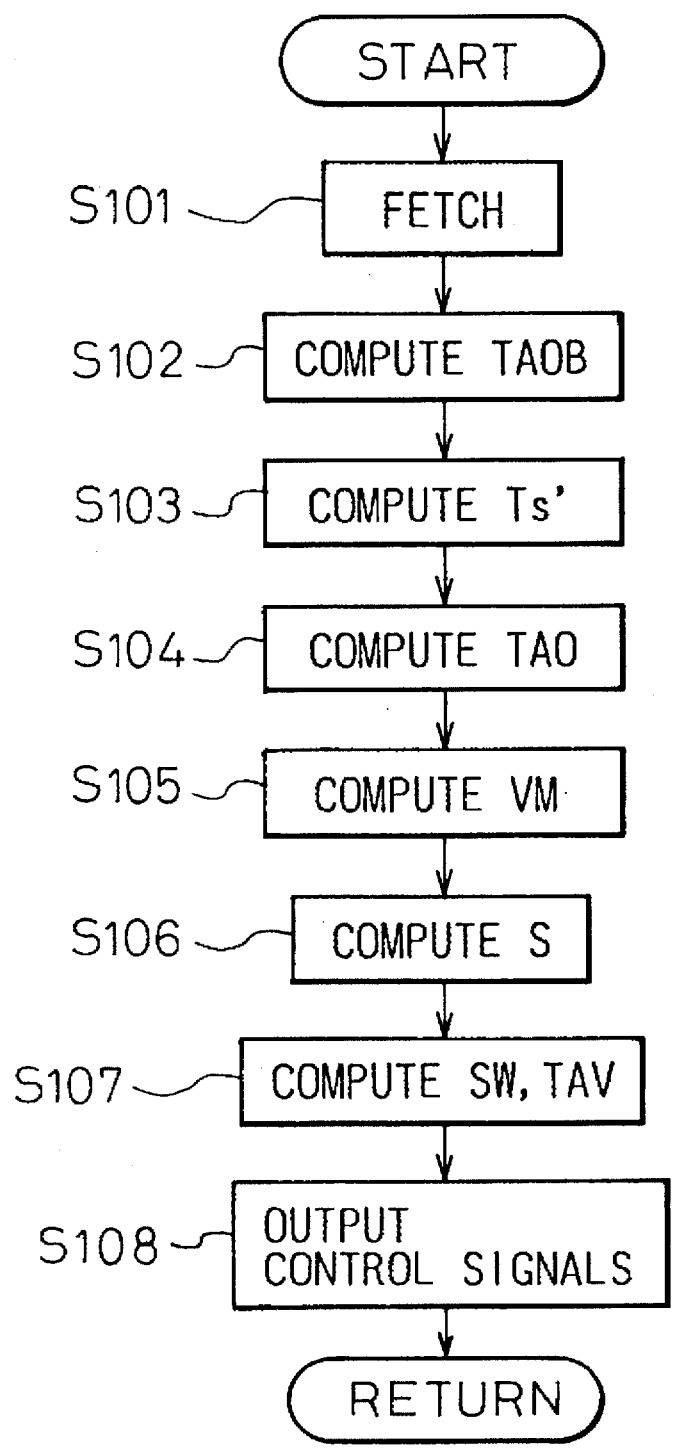
FIG. 2 is a control flowchart relating to the above embodiment.

The operation of the embodiment according to the present invention will be explained based on a flowchart as shown in FIG. 2.

When the automatic air conditioning mode is selected, signals from respective sensors i.e. the inside air temperature sensor 41, the outside air temperature sensor 42, the solar radiation sensor 43, the post-evaporator sensor 44, and the water temperature sensor 45, are converted into digital values (Tr, Tam, Ts, Te, Tw) by the A/D converter, which in turn are read in the RAM of the microcomputer, and at the same time, a signal from the temperature regulator 46 is also read in the RAM in the step S101.

In the step S102, a basic objective temperature of blown air (TAOB) to the car room is obtained by computing the following expression (1) as already stored in the ROM, using the various data in the RAM.

$$TAOB = Kset \times Tset - Kr \times Tr - Kam \times Tam + C \qquad (1)$$

(Kset, Kr, and Kam: gain, and C: constant for correction)

Figure 3:
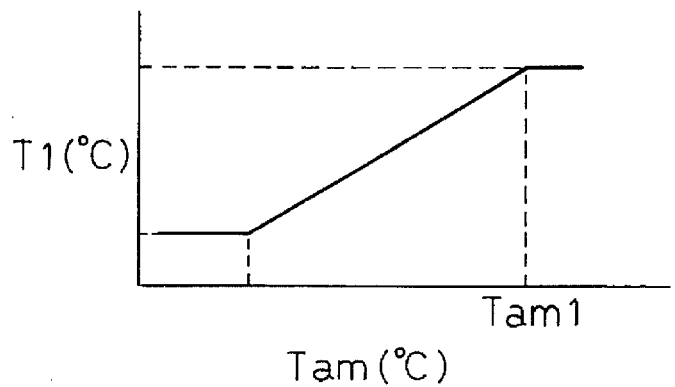
FIG. 3 is a characteristic graphical representation showing the relationship between an outdoor temperature (Tam) and a reference value (T1).

Next, in the step S103, a reference value T1 is determined based on the solar radiation quantity Ts and the characteristic graph (T1 vs Tam) as memorized in the ROM and shown in FIG. 3. Then, a variable GW is determined based on the reference value T1 and the characteristic graph (GW vs Tset–Tr) as memorized in the ROM and shown in FIG. 4. A corrected solar radiation quantity Ts' is obtained by computing the following expression (2) as stored in the ROM in advance, using said variable.

$$Ts' = GW \times Ts \qquad (2)$$

Figure 5:
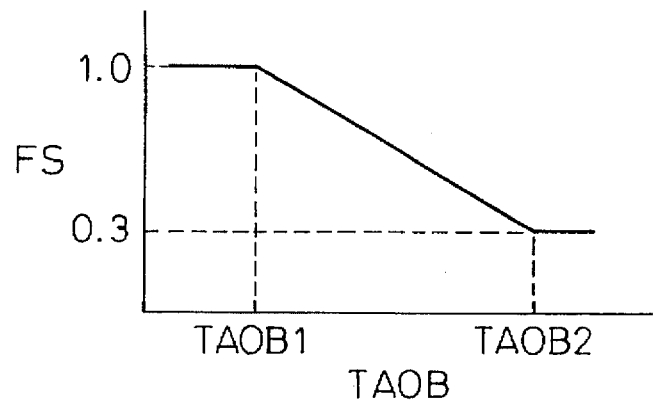
FIG. 5 is a characteristic graphical representation showing the relationship between a basic objective blown air temperature (TAOB) and a variable for weighting solar radiation.

In the next step S104, an weighting variable Fs for solar radiation is determined based on said TAOB and the characteristic graph (Fs vs TAOB) as memorized in the ROM in advance and shown in FIG. 5. Then, an objective blown air temperature (TAO) is obtained by computing the following expression (3), using said weighting variable Fs, TAOB, and Ts'.

$$TAO = TAOB - Fs \times Ks \times Ts' \qquad (3)$$

(Ks: gain)

Figure 6:
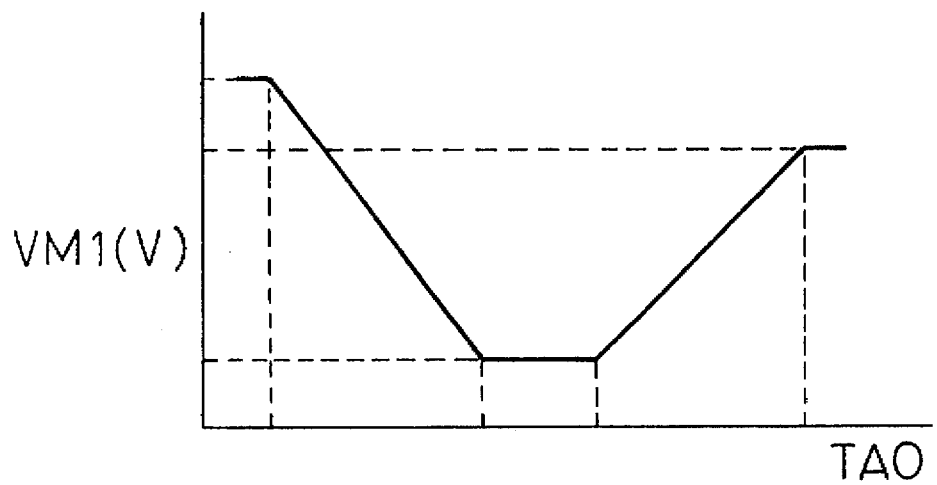
FIG. 6 is a characteristics graphical representation showing the relationship between an objective blown air temperature (TAO) and a basic blower voltage (VM1).
Figure 7:
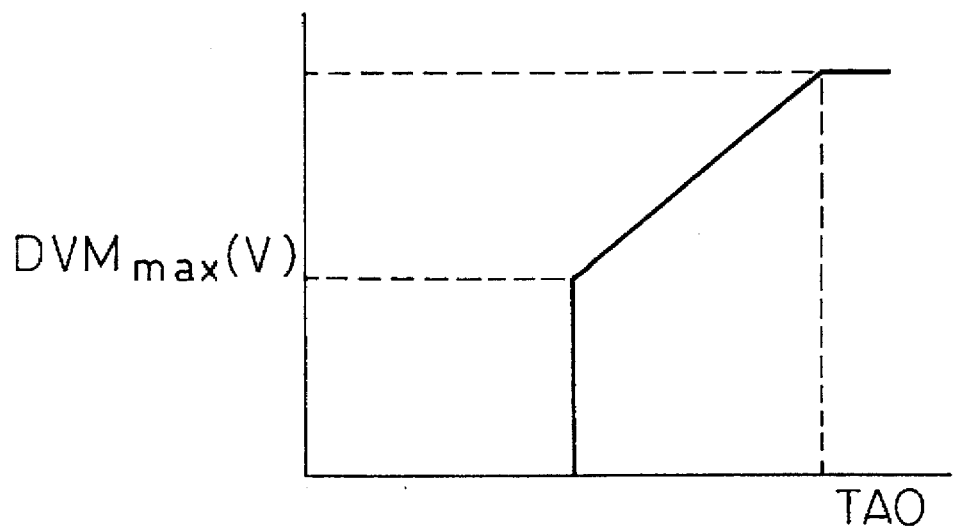
FIG. 7 is a characteristic graphical representation showing the relationship between the objective blown air temperature (TAO) and an increased air volume maximum value (DVMmax).

In the step S105, a basic blower voltage VM1 is determined based on said TAO and the characteristic graph (VM1 vs TAO) as stored in the ROM and shown in FIG. 6. Also, a maximum value of increased air volume DVMmax is determined based on said TAO and the characteristic graph (DVMmax vs TAO) as stored in the ROM and shown in FIG. 7. An increased air volume DVM supplied from the face level air outlet 21 is obtained by computing the following formula (4) as stored in the ROM, using this DVMmax.

$$DVM = \{(1-Fs) \times Ts'/(1-Fs) \times Tsmax\} DVMmax \qquad (4)$$

(Tsmax: constant)

Thus, an objective blower voltage (overall air volume) VM1 is obtained by computing the following expression (5) as stored in the ROM, using said basic blower voltage VM1 and said increased air volume DVM.

$$VM = VM1 + DVM \qquad (5)$$

Figure 8:
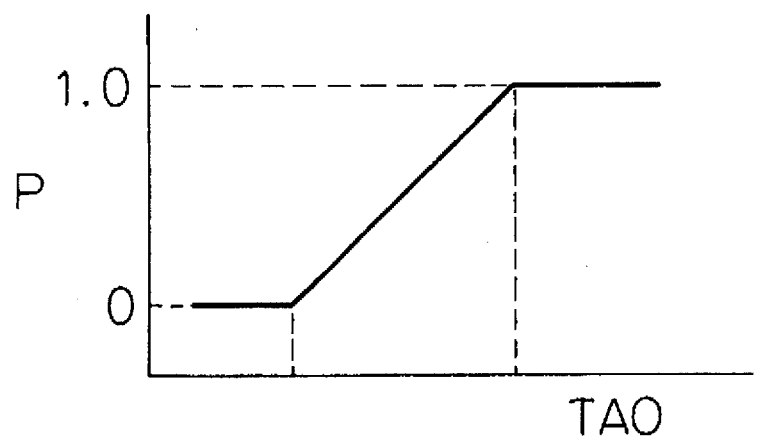
FIG. 8 is a characteristic graphical representation showing the relationship between the objective blown air temperature (TAO) and a basic air outlet mode ratio (P).

In the next step S106, a basic air outlet mode ratio P (ratio of the air volume from the face level air outlet 21 to the foot level air outlet 23) is determined based on said TAO and the characteristic graph (P vs TAO) as stored in the ROM and shown in FIG. 8. A final air outlet mode ratio S is then obtained by computing the following formula (6) as stored in the ROM, using said basic air outlet mode ratio P. If S=0, it means the face mode, if S=1, it does the foot mode, and if 0<S<1, it means a bi-level mode (linear).

$$S = P \times VM1/VM \qquad (6)$$

In the next step S107, an objective open degree SW of the air mixing door 15 is first obtained by computing the following formula (7) as stored in the ROM.

$$SW = \{(TAO-Te)/(Tw-Te)\} \times 100(\%) \qquad (7)$$

Figure 9:
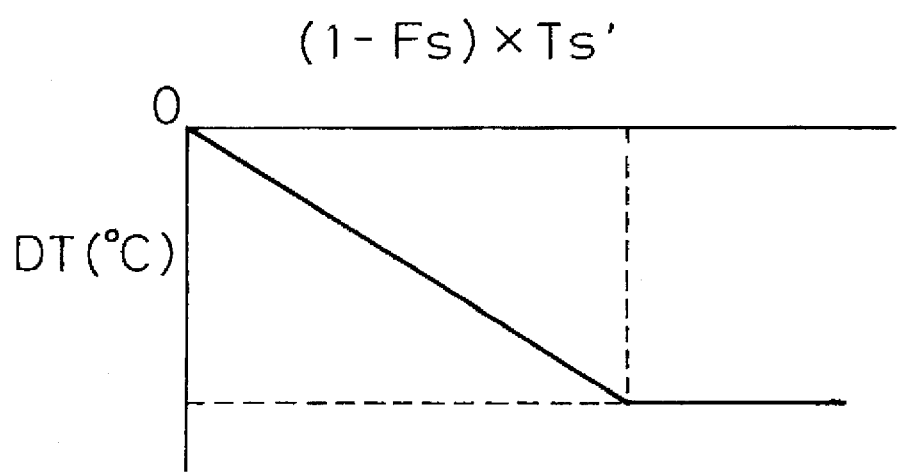
FIG. 9 is a characteristic graphical representation showing the relationship between a value produced by multiplying a corrected solar radiation quantity (Ts') by (1−Fs) and the temperature falling width (DT) in the blown air from a face level air outlet (21).

Then, based on the characteristic graph (DT vs (1–Fs)× Ts') as memorized in the ROM and shown in FIG. 9, there is obtained a falling allowance of blown air temperature DT from the face level air outlet 21 at the solar radiation quantity equivalent to (1–Fs)×Ts', and an objective air outlet temperature TAV is obtained by computing the following expression (8) as stored in the ROM, using said falling allowance DT.

$$TAV = Tset + DT + \alpha \qquad (8)$$

($\alpha$: constant)

Finally, in the step S108, control signals are transmitted to respective actuators in such a manner that the blower voltage, the air outlet mode, the open degree of the air mixing door, and the open degree of the cool air bypassing door 30 will take respective values as computed and determined through the steps from S105 to S104.

Now, an explanation will be made of the weighting variable Fs as obtained in step S104.

As will be understood from FIG. 5, if the car is in the cooling condition at a low temperature (the mode of air outlet is the face mode), namely the basic objective blown air temperature TAOB being TAOB≦TAOB1, Fs is Fs=1. As a result of this, the entirety of the corrected solar radiation quantity Ts' is introduced to TAO as defined by the expression (3). Accordingly, the open degree SW of the air mixing door 15 and the final air outlet mode ratio S, both being determined based on TAO, vary depending on the solar radiation quantity which is detected by the insolation sensor 43. Also, as Fs is equal to 1, the increased air volume DVM which is computed by the formula (4), becomes zero, and the falling allowance of blown air temperature DT, which is determined from FIG. 9, also becomes zero.

Accordingly, if TAOB≦TAOB1 and solar radiation is incident on the car, there is carried out such control that the temperature of the blown air from the face level air outlet 21 is made lower by decreasing the open degree of the air mixing door 15, and at the same time, the air volume from the face level air outlet 21 is increased by boosting the basic blower voltage VM1, thereby offsetting the heat load caused by solar radiation.

On the other hand, when the car is in the space heating condition, namely TAOB≧TAOB2 (the air outlet mode is the foot mode at this time), Fs=0.3, so that 30% of said corrected solar radiation quantity Ts' is introduced to TAO, thus the heat load caused by solar radiation corresponding to 30% of Ts' being offset by this TAO. The reason for reducing the introduction of Ts' to TAO to 30% is for suppressing a reduction in both the opening degree of the air mixing door 15 and the air volume, thereby maintaining a warm feeling around the driver's feet.

The remaining heat load of 70% is offset by adjusting the volume and temperature of the blown air from the face level air outlet 21. More concretely speaking, there is performed such a control that the increased air volume DVM is determined from the expression (4), and also the total air volume VM is determined from the expression (5), and then the blower voltage is adjusted to generate this air volume VM. In this case, said increased air volume DVM becomes larger corresponding to the corrected solar radiation quantity Ts', so that the blower voltage is made larger corresponding to the increase of the corrected solar radiation quantity Ts'.

At this time, as will be seen from the above mentioned expression (6), the final air outlet mode ratio S has a relation 0<S<1, so that the mode becomes the bi-level mode. Further, the value of this S becomes smaller in correspondence with the magnitude of said increased air volume DVM, so that the opening area of the face level air outlet 21 is made larger. Accordingly, the air volume blown from the face level air outlet 21 is increased with an increase in the corrected solar radiation quantity Ts', thereby offsetting the heat load caused by solar radiation.

A graph shown in FIG. 5 shows the weighting variable Fs for solar radiation calculated from the thermal equilibrium formula to compensate for 70% of the corrected solar radiation quantity Ts' when the remaining 30% of the same is canceled by TAO.

The opening degree of the cool air bypass 30 is controlled by the steps of obtaining the falling allowance of blown air temperature DT from FIG. 9, determining the objective air outlet temperature TAV through computation of the expression (8), and changing the temperature of blown air from the face level air outlet 21 to this TAV. In this case, since said falling allowance DT becomes larger with increase of the corrected solar radiation quantity Ts', the temperature of the blown air from the face level air outlet 21 is decreased with increase of the corrected solar radiation quantity Ts', thus the heat load caused by solar radiation is offset.

If TAOB1<TAOB<TAOB2 (the air outlet mode is the bi-level mode at this time), Fs becomes smaller with increase of TAOB.

Figure 4:
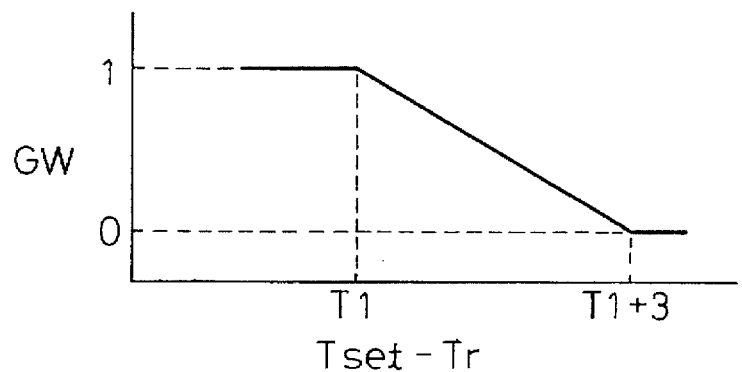
FIG. 4 is a characteristic graphical representation showing the relationship between a setting temperature (Tset) and a variable (GW).

In the above, the corrected solar radiation quantity Ts' is obtained from the above mentioned expression (2) after obtaining the variable GW based on the characteristic graph as shown in FIG. 4. The reason for doing so is clarified in the following.

If the value of Tset–Tr is larger than the value of adding 3° C. to the reference value T1, the inside of the car room is so cooled that the drive might feel cold even though solar radiation is incident on the car, and he would rather wish to warm up the car as quickly as possible. Therefore, if Tset–Tr≧T1+3, the corrected solar radiation quantity Ts' is made to be zero by letting the variable GW be zero.

Accordingly, even in the event, for instance, that TAOB≧TAOB 2, the weighting variable Fs for incident solar radiation quantity becomes 0.3, and the corrected solar radiation quantity of 70% is offset by lowering the temperature of the blown air from the face level air outlet 21 and increasing the air volume from the same, the corrected solar radiation quantity Ts' is made zero if Tset–Tr≧T1+3 as described above, so that neither said lowering of the temperature nor said increase of air volume is carried out. Consequently, if TAOB≧TAOB2, the air having the temperature and volume which are determined based on TAOB is supplied from the foot air outlet 23, thus the top priority for air conditioning is given to space heating.

As a result of giving priority to space heating of the car, if Tset–Tr takes a value between T1 and T1+3 i.e. T1<Tset–Tr<T1+3, the variable GW becomes larger with decrease of Tset–Tr, thus the corrected solar radiation quantity Ts' becomes larger. In other words, the corrected solar radiation Ts' becomes larger with an increase in the car temperature.

The more the car temperature is elevated, the more the driver feels that the incident solar radiation in the car is too hot. Accordingly, in order to change the driver's feeling, the corrected solar radiation quantity Ts' is made larger, and the temperature of blown air from the face level air outlet 21 is lowered while the air outlet volume from the same is made larger, in response to the level of warmth in the car.

When the car is sufficiently warmed up and the condition of Tset–Tr≦T1 is established, which is felt to be too hot by the car driver, the corrected solar radiation quantity Ts' is replaced by the detected solar radiation Ts i.e. Ts'=Ts by letting the variable GW be zero.

Accordingly, when TAOB≧TAOB2, the increased air volume DVM obtained from the formula (4) and the falling allowance of blown air temperature DT obtained from FIG. 9 are determined by the detected solar radiation quantity itself, so that the heat load caused by solar radiation is satisfactorily offset by the blown air sent out of the face level air outlet 21.

It has been explained in the above why the variable GW is first determined from FIG. 4 and then the corrected solar radiation quantity Ts' is computed by the formula (2) based on said variable GW. In the present invention, however, the reference value T1 as utilized in the characteristic graph of FIG. 4 is made variable based on the characteristic graph of FIG. 3. Thus, it is possible to obtain the following effects.

It is a general tendency that the lower the outside air temperature is, the more the car driver prefers a warmer car. In order to meet his preference, as shown in the characteristic graph of FIG. 3, the reference value T1 is set smaller if the outside air temperature is lower than the predetermined outside air temperature Tam1, thereby preventing the corrected solar radiation quantity Ts' from becoming larger unless Tset–Tr becomes adequately smaller compared with that in the case where the outside air temperature is higher than Tam1. In other words, the space heating of the car is given priority compared with the case where the outside air temperature is above Tam1. In this way, a preferable control is carried out to meet the requirement of the car driver who prefers that the lower the outside air temperature is, the warmer the car becomes.

In the embodiment as described in the above, even when space heating is carried out in the foot mode, the mode is changed to the bi-level mode if solar radiation is incident on the car, thereby performing the control for offsetting the heat load caused by solar radiation by blowing the air from the face level air outlet 21. However, when Tset–Tr is larger than T1+3, the temperature falling allowance and the air volume rising allowance becomes zero, thus the air supply from the face level air outlet 21 is made zero, so that the car is quickly warmed up when it is cool. After the car is warmed up, the heat load caused by solar radiation is offset without having the driver feel cold.

Since the reference value T1 is corrected to become lower corresponding to the falling of the outside air temperature, the control can be carried out to meet the car driver's requirements.

In the above mentioned embodiment, the variable GW is made to vary based on Tset–Tr. However, it may be possible to vary the variable GW based on an absolute value of Tr, or based on TAOB and the cooling water temperature Tw of the car engine.

As explained above, according to the first embodiment of the present invention, the space heating of the car can be carried out so as to meet the driver's requirements.

However, in the summer season during which the face mode is usually adopted as the air outlet mode, it becomes difficult to suitably offset the heat load caused by solar radiation if the falling allowance of the objective air outlet temperature is suppressed despite the fact that the solar radiation quantity is increased.

In the second embodiment of the present invention, there is provided an air conditioner for use in a vehicle wherein the heat load caused by solar radiation incident on the car can be suitably offset regardless of the season.

Figure 10:
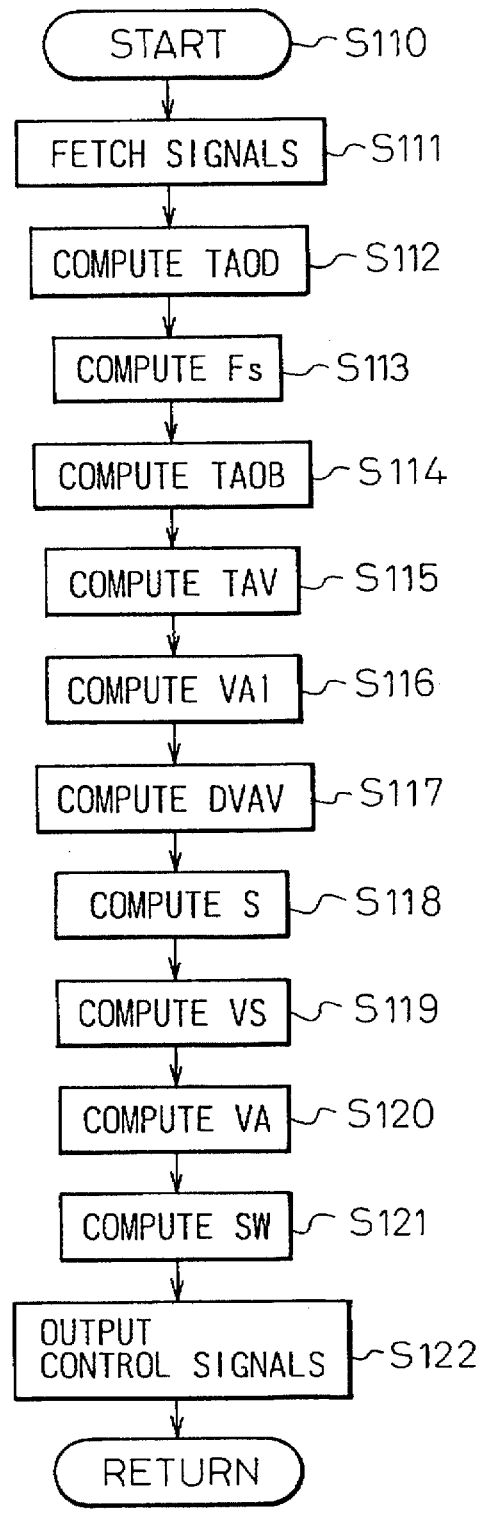
FIG. 10 is a control flowchart of the second embodiment according to the present invention.

The operation of the second embodiment of the present invention will be explained based on a flowchart as shown in FIG. 10.

If the automatic air conditioning control is started at a step 110, respective signals from the inside air temperature sensor 41, the outside air temperature sensor 42, the solar radiation sensor 43, the post evaporator sensor 44, and the water temperature sensor 45, are converted into digital values (Tr, Tam, Ts, Te, Tw) by the A/D converter, which in turn are read in the RAM, and at the same time, a signal from the temperature regulator 46 is also read in the RAM in the step S111.

In the step S112, the first necessary blown air temperature (TAOD) is computed by the following expression (9) as memorized in the ROM and various data as inputted in the RAM.

$$TAOD = Kset \times Tset - Kr \times Tr - Kam \times Tam + C \qquad (9)$$

(Kset, Kr, are Kam and gains, and C is a constant for correction)

Figure 11:
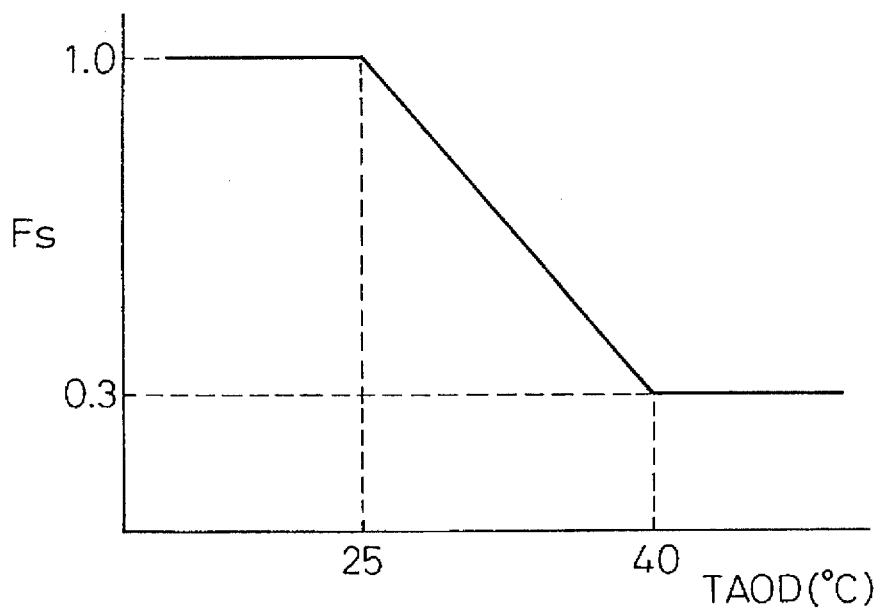
FIG. 11 is a characteristic graphical representation showing the relationship between a first necessary blown air temperature (TAOD) and a distribution ratio (Fs).

In the next step S113, a distribution ratio Fs is determined based on said TAOD and the characteristic graph (Fs vs TAOD) as memorized in the ROM in advance and shown in FIG. 11. Then, in the step 114, the second necessary blown air temperature (TAOB) is computed by the following expression (10) as memorized in the ROM, said distribution ratio Fs, and said TAOD.

$$TAOB = TAOD - Fs \times Ks \times Ts \qquad (10)$$

(Ks is a gain)

In short, if the distribution ratio Fs as computed in the step 113 is 1.0, all of the incident solar radiation quantity Ts, as detected by the solar radiation sensor 43, is reflected in said TAOB, and if the distribution ratio Fs is 0.3, 30% of said detected solar radiation quantity is reflected in said TAOB.

In the next step S115, an objective blown air temperature TAV from the face level air outlet 21 is obtained when the air outlet mode is the bi-level mode. More concretely speaking, the temperature falling allowance DT of the blown air from the face level air outlet 21 is obtained based on the signal Ts from the solar radiation sensor 43 and the characteristic graph (DT vs Ts) memorized in the ROM and shown in FIG. 12. Then, the objective blown air temperature TAV is computed by using said DT and the following expression (11).

$$TAV = Tset - DT + \alpha \qquad (11)$$

(α: constant)

Namely, if the value of Ts is in the range from 0 to 0.5 (kw/m$^2$), the value of TAV becomes smaller with an increase of the incident solar radiation quantity while if the value of Ts is larger than 0.5 (kw/m$^2$), TAV is express as $$TAV = Tset - DT + \alpha(°C.)$$

regardless of the solar radiation quantity.

Figure 13:
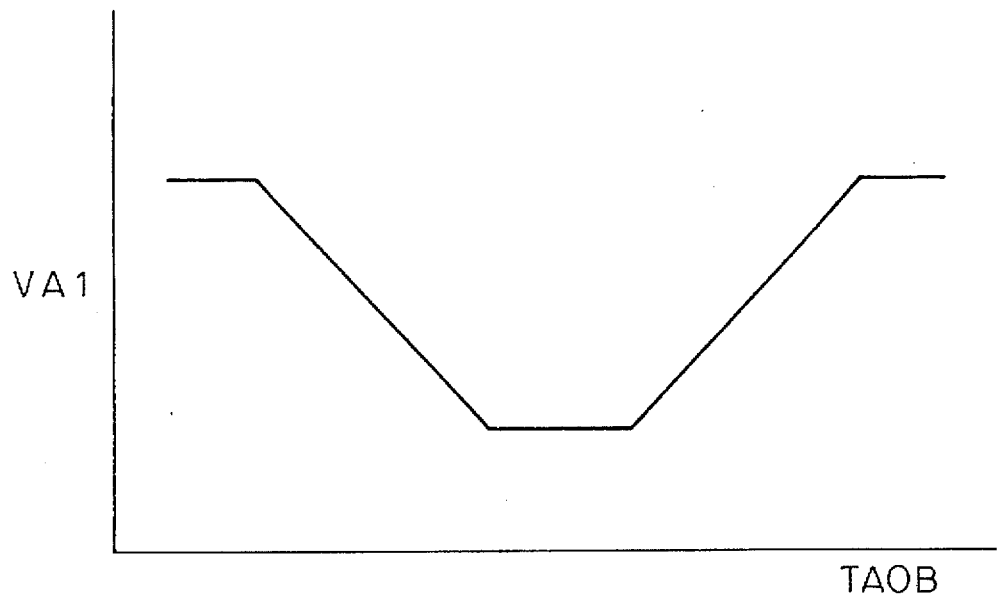
FIG. 13 is a characteristic graphical representation showing the relationship between a second necessary blown air temperature (TAOB) and a basic air volume (VA1).

In the next step 116, a basic air volume VA1 is determined based on said second necessary blown air temperature (TAOB) and the characteristic graph (VA1 vs TAOB) memorized in the ROM and shown in FIG. 13.

Figure 14:
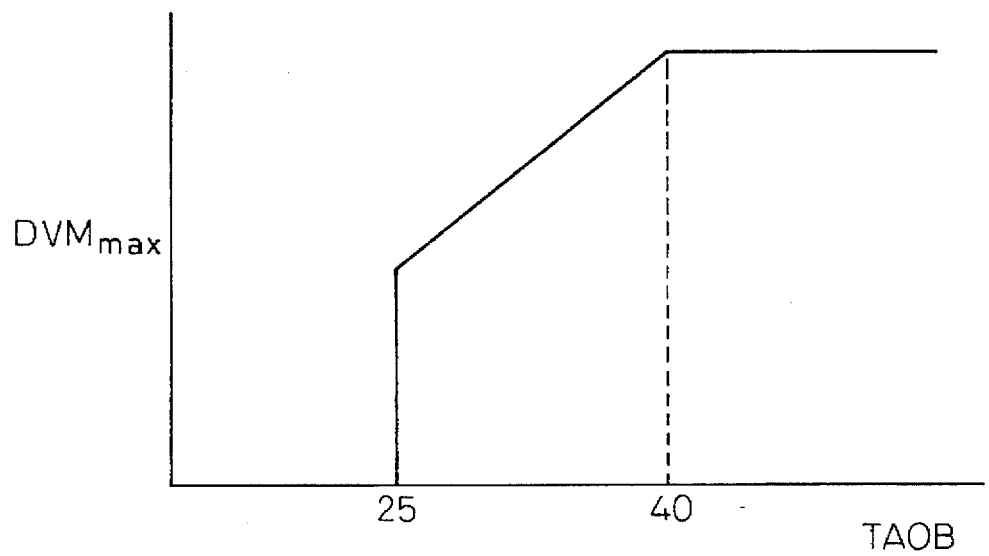
FIG. 14 is a characteristic graphical representation showing the relationship between the second necessary blown air temperature (TAOB) and the increased air volume maximum volume (DVMmax).

Then, in the step 117, the increased air volume DVAV from the face level air outlet 21 is obtained. More concretely speaking, the maximum value of the increased air volume DVMmax is first determined from said TAOB and the characteristic graph (DVMmax vs TAOB) shown in FIG. 14 and memorized in the ROM, and then, the increased air volume DVAV is computed by using said DVMmax and the following expression (13) memorized in the ROM.

$$DVM = (1 - Fs) \times Ts \times DVMmax \qquad (12)$$

Figure 15:
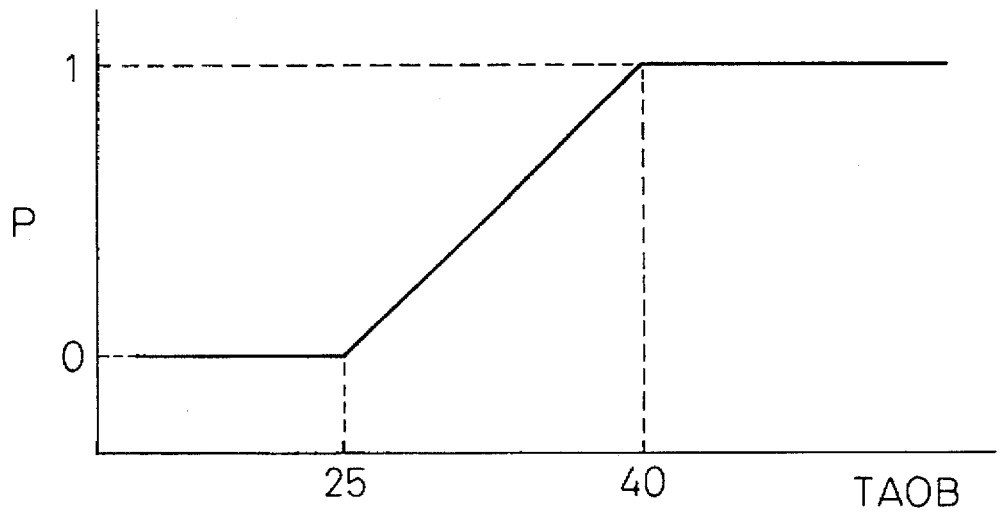
FIG. 15 is a characteristic graphical representation showing the relationship between the second necessary blown air temperature (TAOB) and a basic air outlet mode ratio (P).

In the next step S118, a basic air outlet mode ratio P is first determined based on said TAOB and the characteristic graph (P vs TAOB) memorized in the ROM and shown in FIG. 15. The ratio P means a ratio of the air volume from the foot level air outlet 23 to the total air volume blown to the car room, it being set as P=1 in the foot mode and P=0 in the face mode. A final air outlet mode ratio S is then computed by using the following formula (13) memorized in the ROM, said basic air outlet mode ratio P, said basic air volume VA1 and said increased air volume DVAV.

$$S = P \times VA1/(VA1 + DVAV) \qquad (13)$$

Figure 16:
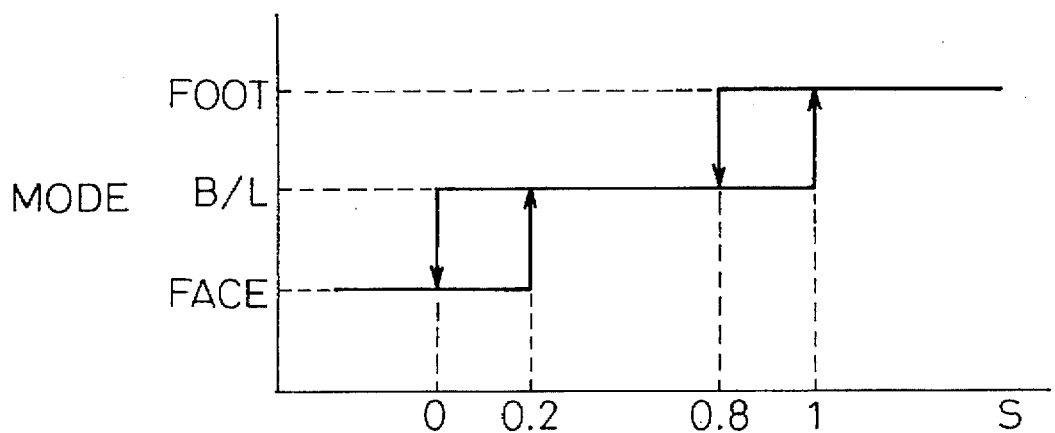
FIG. 16 is a characteristic graphical representation showing the relationship between a final air outlet mode ratio (S) and an air outlet mode.

The final air outlet mode ratio S and respective air outlet modes have a relationship as indicated in the characteristic graph which is memorized in the ROM and shown in FIG. 16.

Figure 17:
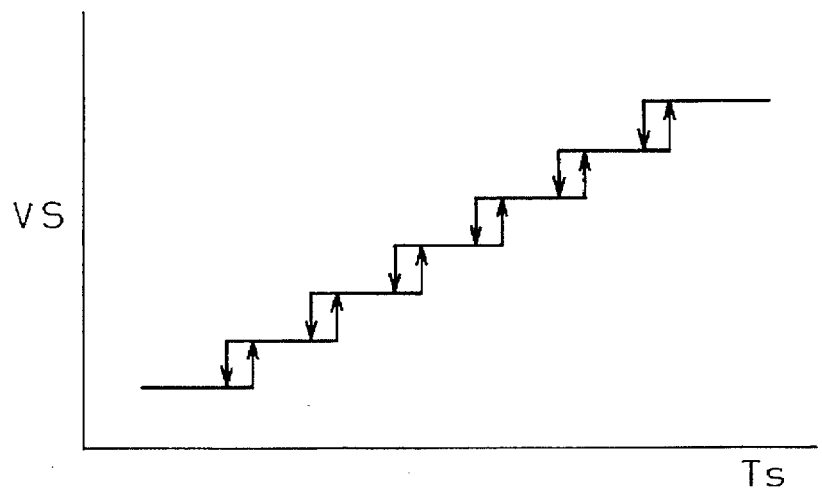
FIG. 17 is a characteristic graphical representation showing the relationship between the detected solar radiation quantity (Ts) and a minimum air volume (VS).

In the next step 119, there is determined, from the characteristic graph (VS vs Ts) memorized in the ROM and shown in FIG. 17, the minimum air outlet volume VS which is necessary for the car driver to be made comfortable with the solar radiation quantity Ts incident in the car room.

In the next step 120, the final air outlet volume VA is computed by the following expression (14) memorized in the ROM, taking account of the incident solar radiation. Namely, the final air outlet volume VA is determined by comparing the basic air outlet volume VA1 plus the increased air outlet volume DVAV with said minimum air outlet volume VS and selecting the larger volume.

$$VA = \max\{(VA1 + DVAV), VS\} \qquad (14)$$

In the next step 121, the open degree SW of the air mixing door 15 is first computed by the following formula (15) memorized in the ROM.

$$SW = \{(TAOB - Te)/(Tw - Te)\} \times 100 \ (\%) \qquad (15)$$

Then, control signals are transmitted to the blower controller 32, and the servo controllers 28, 16 in such a manner that the blower voltage, the air outlet mode, and the open degree of the air mixing door, will take respective values of the final air outlet volume VA, final air outlet mode ratio S, and the final objective open degree SW as computed and determined through the steps of S120, S118, and 121. Further, if the air outlet mode is the bi-level mode, a control signal is transmitted to the servomotor 31 in such a manner that the blown air temperature from the face level air outlet 21 takes the value of the objective blown air temperature TAV as computed in the step 115.

According to the control as described above, as will be understood from the formula (13) and FIG. 15, if the car space heating is carried out at a high temperature level like TAOD≧40(°C.), the air outlet is performed in the foot mode in case of no incident solar radiation while if the incident solar radiation exists, as will be seen from the formula (13), the final air outlet mode ratio S takes a value between 0 and 1 (0<S<1), thus the air outlet mode is the bi-level mode.

Also, as will be understood from FIG. 11, since Fs=0.3 in this case, 30% of the solar radiation quantity Ts, as detected by the solar radiation sensor 43, is reflected in TAOB, so that the heat load caused by 30% of Ts is offset by this TAOB.

The reason for reflecting only 30% of Ts in TAOB is for suppressing reduction of both the opening degree of the air mixing door 15 and the air volume, thereby keeping the driver warm at his foot area.

The remaining heat load of 70% is offset by adjusting the volume and temperature of blown air from the face level air outlet 21. More concretely speaking, such a control is carried out by the steps of computing the increased air volume DVAV from the expression (12), computing the final air volume VA, and then controlling the blower voltage to generate this air volume VA. In this case, said increased air volume DVAV becomes larger corresponding to the detected solar radiation quantity Ts, so that the blower voltage is made larger with an increase of the detected solar radiation quantity Ts.

When TAOD≧40° C. the air is blown from the face level air outlet 21 in correspondence with the increased DVAV to offset the heat load caused by solar radiation. However, reduction in the open degree of the air mixing door 15, which is caused by solar radiation, is made smaller as described above, so that the temperature inside the car room is kept at a level which does not give an unpleasant feeling.

FIG. 11 is a characteristic graph which is drawn based on the blower voltage decided by TAOB in which 30% of the detected solar radiation is reflected and the resultant air volume derived from the thermal equilibrium formula, said air volume being necessary for offsetting the remaining 70% of the detected solar radiation quantity Ts in the air outlet mode.

When the car is cooled at a low temperature such that TAOD≦25° C. the air outlet mode is set to the face mode regardless of the existence of incident solar radiation. In this case, all the detected solar radiation quantity Ts is reflected in the second necessary blown air temperature TAOB by letting Fs be equal to 1. Accordingly, if solar radiation is incident on the car, TAOB becomes smaller and the opening degree of the air mixing door 15 is made smaller correspondingly thereto, so that the temperature of the blown air from the air outlet 21 is made lower, and the basic air volume VA1 is increased, thereby the air volume from the air outlet 21 being increased and the heat load caused by the solar radiation is offset.

If 25(°C.)<TAOD<40(°C.), in most cases, the air outlet mode is the bi-level mode regardless of the existence of solar radiation. In this case, the distribution ratio Fs becomes smaller with an increase in TAOB i.e. approaching the space heating mode. Accordingly, if TAOD is in the car cooling mode near 25(°C.), the solar radiation is offset by increasing the degree of reflecting the detected solar radiation quantity Ts in TAOB. The closer to the car space heating mode TAOD is, the more the reflection degree of Ts to TAOB is made small, thereby offsetting the heat load caused by solar radiation, thus keeping warmth around the car driver's foot area, suppressing the temperature falling in the blown air from the face level air outlet 21, and avoiding giving an unpleasant feeling to the car driver.

As described above, according to the second embodiment of the invention, it becomes possible to offset the solar radiation quantity incident in the car room by means of the control method suitably adjusting to the respective seasons.

Figure 18:
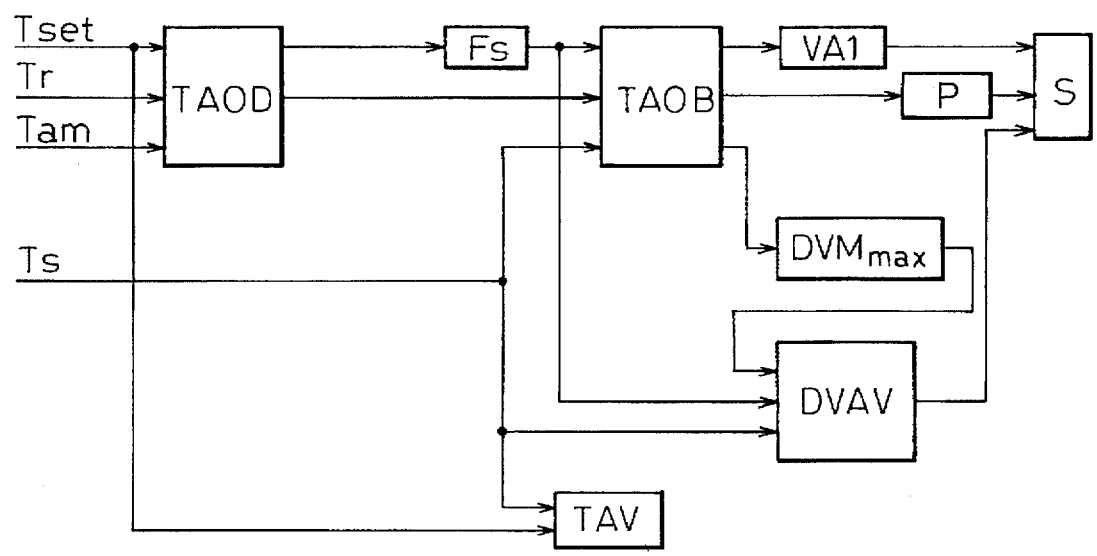
FIG. 18 is a block diagram showing respective constituents in the control specification of the first embodiment.

Constituents according to the control specification of the present embodiment are illustrated in block form in FIG. 18.

Respective steps as shown in FIG. 10 constitute means for realizing their respective functions.

The third embodiment of the present invention will be described by limiting the description to only the points different from the second embodiment.

Figure 19:
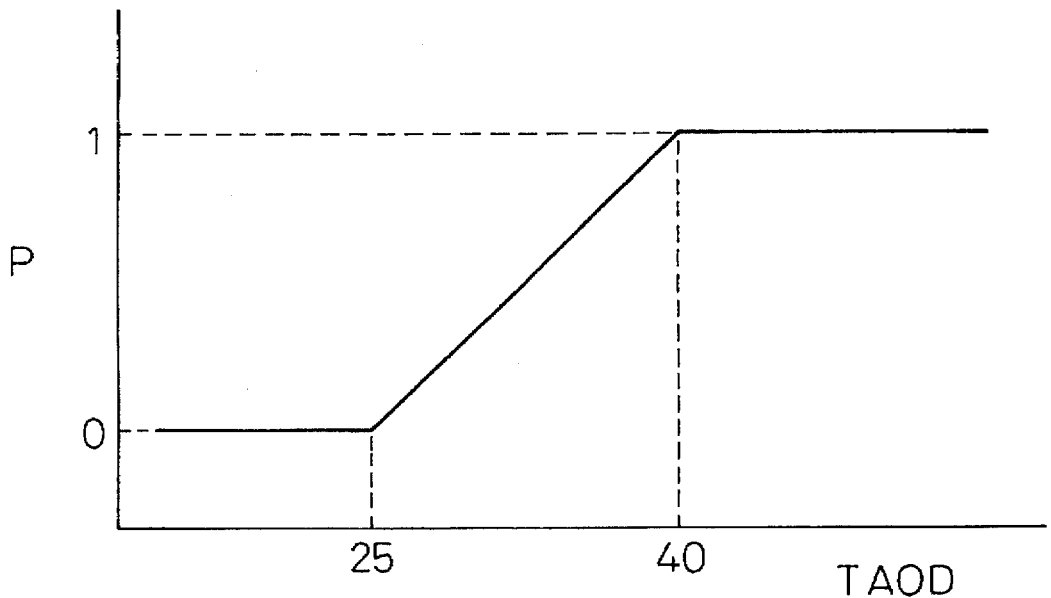
FIG. 19 is a characteristic graphical representation showing the relationship between the first necessary blown air temperature (TAOD) and a basic air outlet mode ratio (P) in the second embodiment of the invention.
Figure 20:
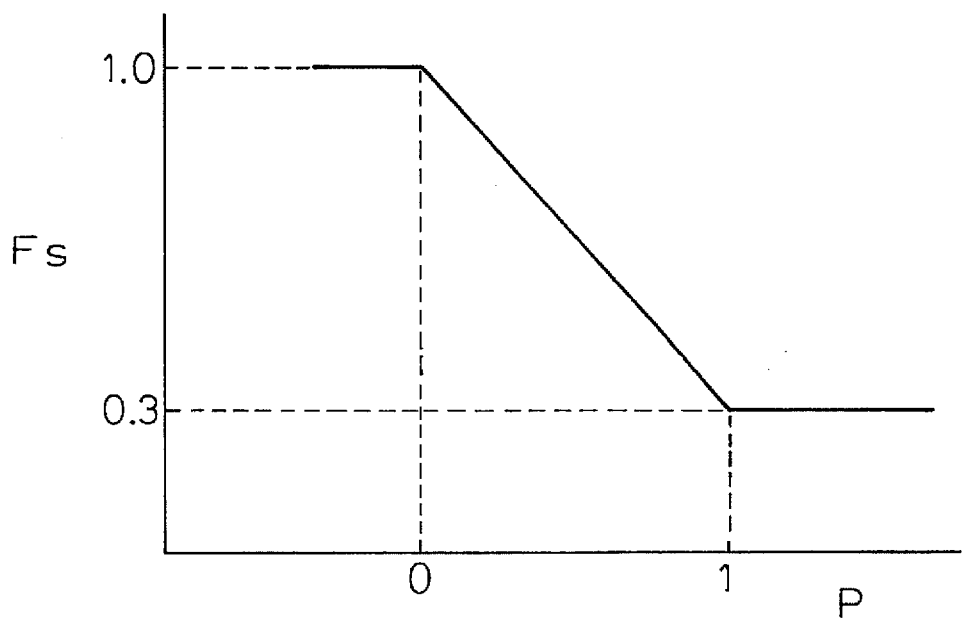
FIG. 20 is a characteristic graphical representation showing the relationship between the basic air outlet mode ratio (P) and the distribution ratio (Fs).
Figure 21:
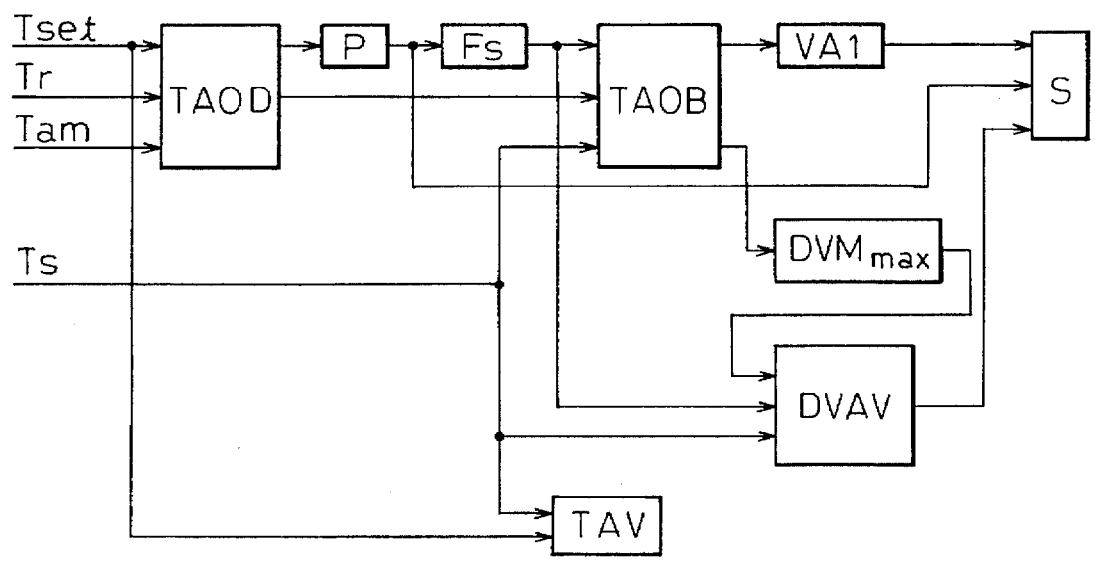
FIG. 21 is a block diagram showing respective constituents in the control specification of the second embodiment.

In the second embodiment above, the distribution ratio Fs is determined based on TAOD and the characteristic graph in FIG. 11 in the step 113, but in the present embodiment, the distribution ratio Fs is obtained by steps of computing the basic air outlet mode ratio P with no solar radiation, based on TAOD and the characteristic graph of FIG. 19, and determining Fs based on said P and the characteristic graph shown in FIG. 20. Constituents according to the control specification of the present embodiment are illustrated in block form in FIG. 21.

In respective embodiments as mentioned above, the objective blown air temperature TAV from the face level air outlet 21 is computed by using the expression (3), but it may be possible to use a predetermined constant (for instance 25° C.) instead of a term Tset.

In the respective embodiments mentioned above, the blown air temperature from the face level air outlet 21 is adjusted by adjusting the open degree of the cool air bypass 30, but it may be possible to adjust the blown air temperature by dividing the inside of the duct 11 into two paths i.e. a face level air outlet path communicated with the face level air outlet 21 and a foot level air outlet path communicated with the foot level air outlet 23, providing respective said paths with an air mixing door, and adjusting the open degree of each of said air mixing doors.

In respective embodiments as mentioned above, it is designed that the first necessary blown air temperature TAOD includes no solar radiation quantity Ts, but it may be possible for TAOD to include a fraction of Ts. Namely, in the respective embodiments, the distribution ratio Fs is always 0.3 or more, so that more than 30% of the detected solar radiation quantity Ts is always included in TAOB. Therefore, it may be possible to have the first necessary blown air temperature TAOD include 30% of the detected solar radiation quantity Ts in advance and to have the second necessary blown air temperature TAOB included the remaining 70% of the solar radiation quantity.

Figure 12:
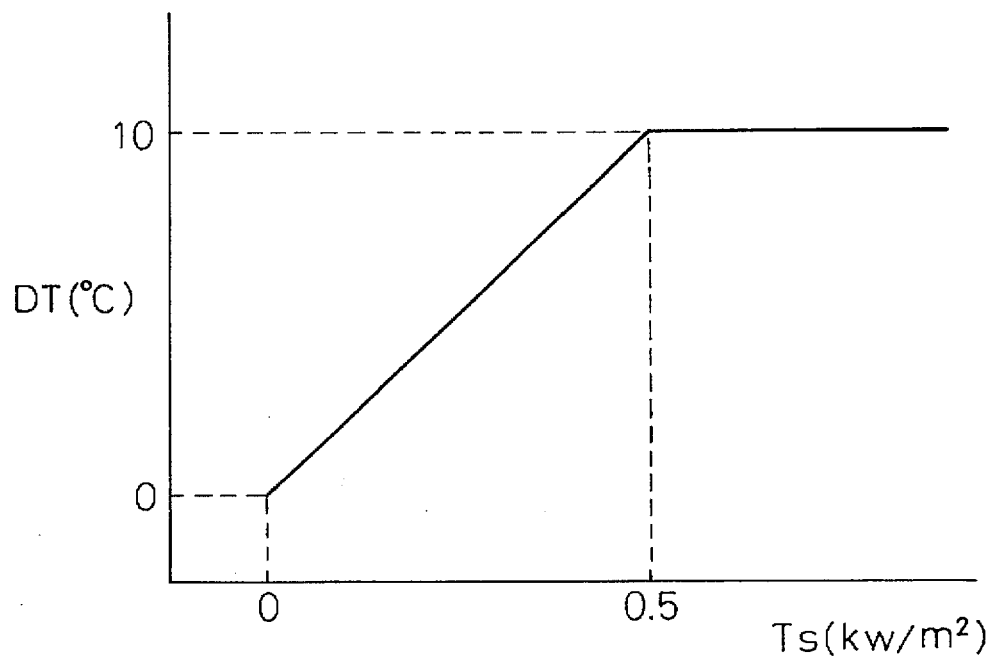
FIG. 12 is a characteristic graphical representation showing the relationship between a detected solar radiation quantity (Ts) and a temperature falling allowance (DT).
Figure 22:
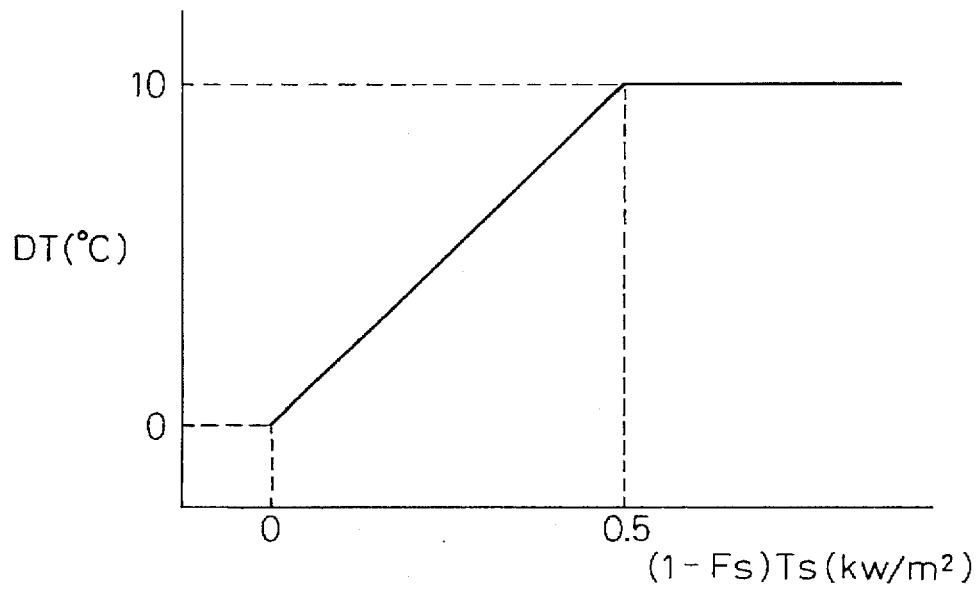
FIG. 22 is a characteristic graphical representation showing the relationship between a detected solar radiation quantity ((1−Fs)Ts) and the temperature falling allowance (DT) in the other embodiment of the invention.

In the steps 113 of the respective embodiments as mentioned above, the objective blown air temperature TAV is obtained through the steps of determining the temperature falling magnitude DT from the characteristic graph of FIG. 12, and then, determining TAV from this DT and the setting temperature Tset. However, it may be possible to determine said DT from the characteristic graph shown in FIG. 22 and stored in the ROM. Namely, if Fs is 1, let DT be 0, and if Fs is 0.3, let DT be determined from the characteristic graph of FIG. 22 based on 70% of the detected solar radiation quantity Ts.

In the third embodiments as mentioned above, the basic air outlet mode ratio P is computed based on the first necessary blown air temperature, but it may be possible to compute said P from the outside air temperature Tam, for instance. In this case, if the outside air temperature Tam is lower than a first predetermined temperature, let P be 1, if Tam is between the first predetermined temperature and the second predetermined temperature higher than the first, let P become smaller with increase of Tam, and if Tam is higher than the second predetermined temperature, let P be 0.

What is claimed is:

1. An air conditioner for use in a vehicle of a type wherein there are provided:

an air supply means for generating an air flow, an air path for introducing the air from said air supply means to a vehicle compartment, means for adjusting the air temperature inside said air path, a face duct which is arranged inside said air path downstream of said air temperature adjusting means and is provided, at its end portion, with a face level air outlet for use in blowing air toward the upper half of a vehicle driver, a foot duct which is arranged inside said air path downstream of said air temperature adjusting means and is provided, at its end portion, with a foot level air outlet for use in blowing air toward the vehicle driver's foot area, means for setting a vehicle inside air temperature, means for detecting a vehicle inside air temperature, means for detecting an outside air temperature, and means for computing a basic objective temperature of the air blown into the vehicle compartment based on a setting temperature as set by said temperature setting means, an inside air temperature detected by said inside air temperature detecting means, and an outside air temperature detected by said outside air temperature detecting means, and control of the temperature and volume of the blown air from said face level air outlet and said foot level air outlet being performed by controlling said air temperature adjusting means and said air supply means based on said basic objective blown air temperature, said air conditioner for use in a vehicle comprising:

means for detecting the quantity of an incident solar radiation in the vehicle, means for correcting the incident solar radiation quantity in such a manner that, if the vehicle inside air temperature becomes lower, exceeding a predetermined reference temperature with respect to a predetermined reference value, said detected incident solar radiation quantity is corrected to become smaller, means for determining a falling allowance of the blown air temperature in such a manner that if said blown air temperature is higher than the reference value, the larger said corrected incident solar radiation quantity becomes, the more the temperature falling allowance of the blown air from said face level air outlet is enlarged, means for determining a rising allowance of the blown air volume in such a manner that if said blown air temperature is higher than the reference value, the larger said corrected incident solar radiation quantity becomes, the more the volume rising allowance of the blown air from said face level air outlet is enlarged, and a control means which controls said temperature adjusting means in such a manner that the temperature of the blown air from said face level air outlet is reduced by said falling allowance, and also controls said air supply means in such a manner that the blown air volume from said face level air outlet is increased by said rising allowance.

2. An air conditioner as claimed in claim 1, wherein said temperature adjusting means has:

means for cooling the air in said air path, which is arranged inside said air path, means for heating the air in said air path, which is arranged inside said air path so as to be located downstream of said cooling means, a bypass which is arranged inside said air path in order to have the air in said air path bypass said heating means, an air mixing door for adjusting a ratio of the cooled air from said cooling means passing said heating means to the same passing said bypass, means for driving said air mixing door, a cooled air bypass which branches out of said air path and directly introduces the cooled air passing said cooling means to said face duct, means for opening and shutting said cooled air bypass, and means for driving said opening and shutting means of said cooled air bypass, wherein control of the temperature of the blown air from said face level air outlet and said foot level air outlet being carried out by controlling said air mixing door driving means based on said objective blown air temperature, and said control means controls said cooled air bypass driving means to reduce the temperature of the blown air from said face level air outlet by said temperature falling allowance.

3. An air conditioner as claimed in claim 1, wherein said temperature adjusting means includes:

means, for cooling the air in said air path, which is arranged inside said air path, means, for heating the air in said air path, which is arranged inside said air path so as to be located downstream of said cooling means, a bypass which is arranged inside said air path in order to have the air in said air path bypass said heating means, and an air mixing door for adjusting the ratio of the cooled air from said cooling means passing said heating means to the same passing said bypass, means for driving said air mixing door, said face duct and foot duct being provided at their inlet portions with means for selectively opening and shutting the air outlet of said ducts and means for driving said air outlet opening and shutting means, whereby the temperature of the blown air from said face level air outlet and said foot level air outlet is controlled by controlling said air mixing door driving means based on said objective blown air temperature, and said control means controls said air supply means and said means for driving said air outlet opening and shutting means, to increase the volume of the blown air from said face level air outlet by said volume rising allowance.

4. An air conditioner as claimed in claim 1, wherein said incident solar radiation quantity correction means corrects the detected incident solar radiation quantity in such a manner that if the vehicle inside air temperature becomes lower exceeding a predetermined reference temperature with respect to a predetermined reference value, the lower said inside air temperature becomes, the more said detected incident solar radiation quantity is made smaller.

5. An air conditioner as claimed in claim 4, wherein said detected incident solar radiation quantity is corrected to be zero if the vehicle inside air temperature becomes lower, with respect to a predetermined reference value, and exceeds a predetermined second reference temperature which is larger than said predetermined reference temperature.

6. An air conditioner as claimed in claim 4, wherein said predetermined reference value is a setting temperature which is set by said temperature setting means.

7. An air conditioner as claimed in claim 1, wherein there is provided means for correcting a predetermined reference temperature, which corrects said predetermined reference temperature to be made smaller if the outside air temperature as detected by said outside air temperature detecting means is lower than a predetermined outside air temperature.

8. An air conditioner as claimed in claim 7, wherein said predetermined reference temperature correction means corrects said predetermined reference temperature in such a manner that if the detected outside air temperature is lower than the predetermined outside air temperature, the lower the outside air temperature becomes, the more said predetermined reference temperature is made small.

9. An air conditioner for use in a vehicle comprising:
   an air supply means for generating air flow,
   an air path for introducing the air from said air supply means to a vehicle compartment space,
   means for adjusting the air temperature in said air path,
   a face duct which is arranged inside said air path downstream of said air temperature adjusting means and is provided, at its end portion, with a face level air outlet which is used for blowing air toward the upper half of a vehicle driver,
   a foot duct which is arranged inside said air path downstream of said air temperature adjusting means and is provided, at its end portion, with a foot level air outlet which is used for blowing air toward the feet area of the vehicle driver,
   means for setting a vehicle inside air temperature,
   means for detecting a vehicle inside air temperature,
   means for detecting an outside air temperature, and
   means for computing a first necessary temperature of the air blown into a vehicle based on a setting temperature as set by said temperature setting means, an inside air temperature detected by said inside air temperature detecting means, and an outside air temperature detected by said outside air temperature detecting means,
   means for detecting the quantity of solar radiation incident on the vehicle,
   means for computing a second necessary temperature of the air blown into the vehicle based on said first necessary blown air temperature and a predetermined quantity of said detected incident solar radiation quantity,
   means for controlling said temperature adjusting means in such a manner that the blown air temperature from said face level air outlet, and from said foot level air outlet, becomes said second necessary blown air temperature,
   means for computing an increased air volume from said face level air outlet based on the remaining solar radiation quantity which is a difference between said detected incident solar radiation quantity and said predetermined quantity,
   means for controlling said air supply means in such a manner that the air volume supplied from said face level air outlet is increased by said increased air volume as computed by said increased air volume computing means, and
   a ratio computing means for computing a ratio of said predetermined quantity to said remaining quantity based on a physical quantity relating to respective seasons.

10. An air conditioner as claimed in claim 9, wherein said physical quantity relating to respective seasons is said first necessary blown air temperature.

11. An air conditioner as claimed in claim 9, wherein said physical quantity is a ratio of the blown air volume from said face level air outlet to the same from said foot level air outlet.

12. An air conditioner as claimed in claim 11, wherein said blown air volume ratio is computed based on said first necessary blown air temperature.

13. An air conditioner as claimed in claim 9, wherein said physical quantity is said outside air temperature as detected by said outside air temperature detecting means.

14. An air conditioner as claimed in any one of claims 9 through 13, wherein said ratio computing means is a means for deciding a reference value which arbitrarily sets it to a number from 0 to 1 based on said physical quantity relating to respective seasons,
   said second necessary blown air temperature computing means computes said second necessary blown air temperature based on said first necessary blown air temperature and a product of said detected incident solar radiation quantity and said reference value, and
   said increased air volume computing means computes said increased air volume based on a product of a resultant value which is made by subtracting said reference value from 1 and said detected incident solar radiation.

15. An air conditioner as claimed in claim 9, said ratio computing means computes said ratio in such a manner that the more said physical quantity relating to respective seasons represents the summer season, the more said predetermined quantity is increased by reducing said remaining quantity.

16. An air conditioner as claimed in claim 9, wherein said temperature adjusting means has:
   means for cooling the air in said air path, which is arranged inside said air path,
   means for heating the air in said air path, which is arranged inside said air path so as to be located downstream of said cooling means,
   a bypass which is arranged inside said air path in order to have the air in said air path bypass said heating means,
   an air mixing door for adjusting a ratio of the cooled air from said cooling means passing said heating means to the same passing said bypass,
   means for driving said air mixing door,
   a cooled air bypass which branches out of said air path and directly introduces the cooled air passing said cooling means to said face duct,
   means for opening and shutting said cooled air bypass, and
   means for driving said opening and shutting means of said cooled air bypass, and
   said temperature control means controlling:
   the temperature of the blown air from said face level air outlet and said foot level air outlet by controlling said air mixing door driving means based on said second necessary blown air temperature, and
   said cooled air bypass driving means to reduce the temperature of the blown air from said face level air outlet by a temperature falling allowance.

* * * * *